United States Patent
Park

(10) Patent No.: US 7,099,274 B2
(45) Date of Patent: Aug. 29, 2006

(54) VOIP SYSTEM AND METHOD FOR PREVENTING DATA LOSS IN THE SAME

(75) Inventor: Min Soo Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1146 days.

(21) Appl. No.: 09/898,829

(22) Filed: Jul. 3, 2001

(65) Prior Publication Data

US 2002/0059483 A1    May 16, 2002

(30) Foreign Application Priority Data

Oct. 27, 2000    (KR)    ............... 2000-63624

(51) Int. Cl.
*H04L 12/26*    (2006.01)
(52) U.S. Cl. ...................... 370/230; 370/352
(58) Field of Classification Search ............... 370/230, 370/231, 235, 236, 252, 352, 232, 389, 392, 370/522, 394
See application file for complete search history.

(56) References Cited

U.S. PATENT DOCUMENTS

| 6,459,696 | B1 * | 10/2002 | Carpenter et al. | .......... 370/350 |
| 6,678,267 | B1 * | 1/2004 | Anandakumar et al. | .... 370/356 |
| 6,700,870 | B1 * | 3/2004 | Brandt et al. | ............... 370/230 |
| 6,868,094 | B1 * | 3/2005 | Bordonaro et al. | ......... 370/516 |

* cited by examiner

*Primary Examiner*—Brian Nguyen

(74) *Attorney, Agent, or Firm*—Lee, Hong, Degerman, Kang & Schmadeka

(57) ABSTRACT

The present invention relates to a VoIP (Voice over Internet Protocol) system and a method for preventing data loss in the same. A receiving system in the VoIP system decides a hold time corresponding to the loss rate of compressed voice data, and provides the hold time to a transmission system. The transmission system adjusts voice input speed depending on the hold time. Therefore, the transmission system can regulate compressed voice data generation rate therein not to exceed a designated channel capacity.

21 Claims, 4 Drawing Sheets

| IP header | UDP header | service identifier (A) | session ID number (B) | hold time (C) |

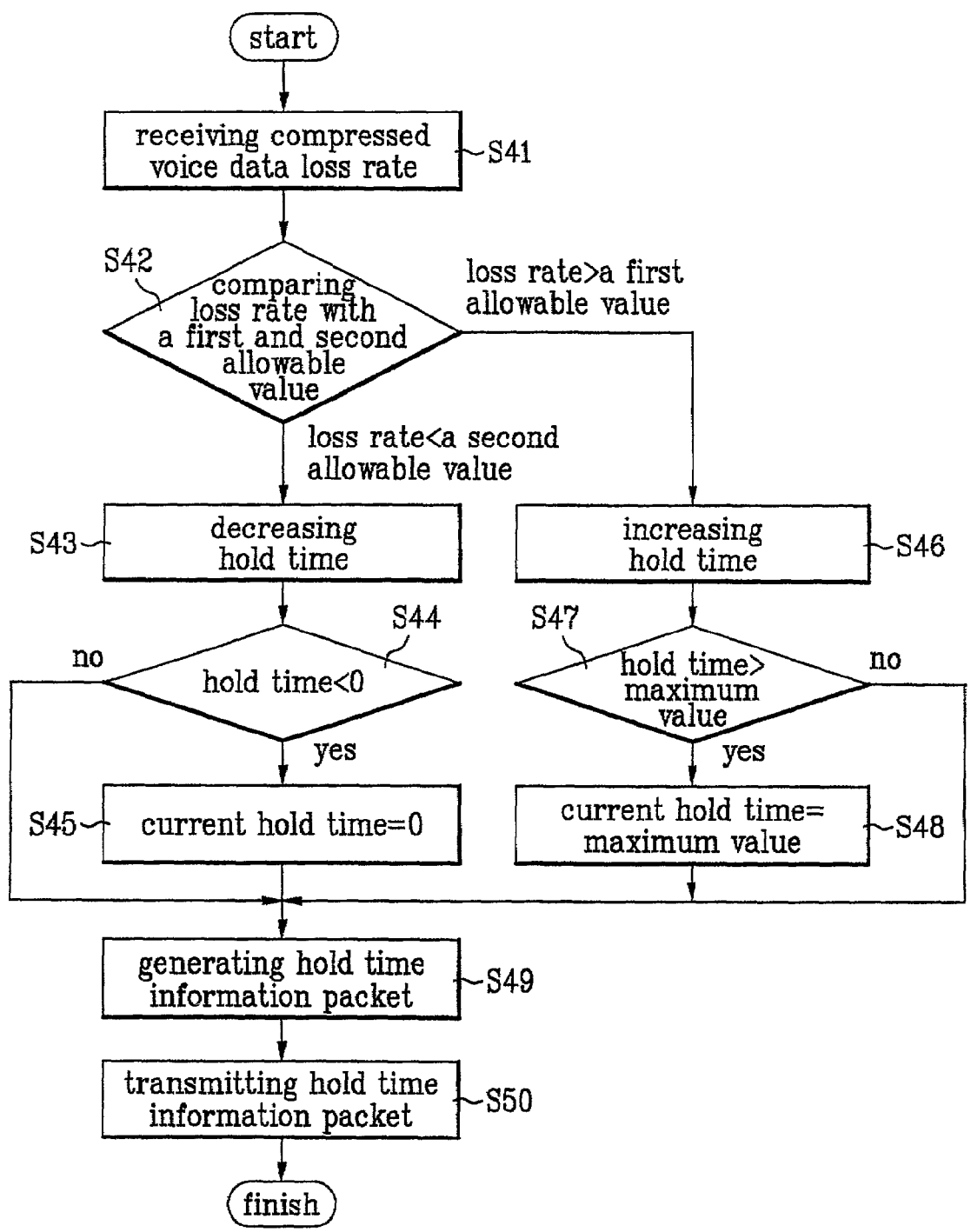

VOIP SYSTEM AND METHOD FOR PREVENTING DATA LOSS IN THE SAME

BACKGROUND OF THE INVENTION

1. Field of the Invention

The present invention relates to a VoIP (Voice over Internet Protocol) system and a method for preventing data loss in the same.

2. Description of the Related Art

Most current systems for voice over an Internet Protocol (VoIP) are built as described in a block diagram (FIG. 1) which illustrates a construction of the VoIP system for voice communication, that is, placing and receiving internet-based calls in prior art.

As illustrated in FIG. 1, basically the conventional VoIP system for voice communication through internet comprises a transmission system 50 that converts the recipient's voice to voice data and transmits the voice data over the internet, and a receiving system 60 that receives the voice data from the transmission system and converts the voice data back to the voice. The transmission system 50 is equipped with a microphone 10, ADC (Analog to Digital Converter) 11, a voice encoder 12, and a transmitting protocol processing part 13. The receiving system 60 is equipped with a receiving protocol processing part 14, a voice decoder 15, DAC (Digital to Analog Converter) 16, and a speaker 17.

The conventional VoIP system is operated as follows:

The microphone 10 in the transmission system 50 creates an analogue voice signal from the inputted voice by the transmitter, and the ADC 11 converts the analogue voice signal to a digital voice signal.

The voice encoder 12 compresses the digital voice signal to generate compressed voice data, and the transmitting protocol processing part 13, in order to transmit the compressed voice data to the receiving part over the internet, attaches a header and a trailer to the compressed voice data and generates voice packets.

On the other hand, the receiving protocol processing part 14 in the receiving system 60 analyzes the voice packets received from the transmission part, and extracts the compressed voice data from the voice packets by removing the header and the trailer that are installed in the voice packets.

The voice decoder 15, through decompression of the compressed voice data, restores the digital voice signal, and the DAC 16 converts the digital voice signal to an analog voice signal.

The speaker 17 converts the analog voice signal to the voice of the transmitter to help the recipient to be able to listen to the transmitter's voice.

As explained above, voice communication quality over the VoIP—based system is generally dependent on the number of voice packets per time unit (i.e., compressed voice data generation rate) corresponding to the conversation speed of the transmitter as inputted through the microphone 10 in the transmission system 10.

In other words, in case the inputted conversation speed exceeds the allowable number of voice packets for transmission per time unit (i.e., Channel Capacity) over the internet, some of packets corresponding to the difference from the compression voice data generation rate and the channel capacity are not transmitted to the recipient and get lost, consequently deteriorating the speech quality.

Therefore, the transmitter is encouraged to adjust his or her conversation speed to be inputted through the microphone 10 in order to ensure that the voice packets he or she transmitted are safely transmitted to the recipient without a loss.

For example, since the compression voice data generation rate should not exceed the channel capacity assigned to himself or herself, the transmitter can temporarily stop voice input for a certain period of time and continue later for decreasing the compression voice data generation rate, in case the compression voice data generation rate exceeds the designated channel capacity to himself or herself.

Previously, the recipient, when there was a blank while listening to the transmitter's voice, let the transmitter know that he or she was having difficulty in catching the transmitter's voice, and the transmitter adjusted his or her voice volume accordingly.

However, the previous method described above had a problem because the conversation speed control was made primarily by the transmitter's sense, making it difficult to suppress the compressed voice data generation rate under the channel capacity. Thus, it was very hard to prevent the voice packet loss in the conventional system.

SUMMARY OF THE INVENTION

It is, therefore, an object of the present invention to provide a VoIP system in which a receiving system determines a hold time according to compressed voice data loss rate and a transmission system adjusts the conversation speed using the hold time, and a method for preventing data loss in the VoIP system.

Another object of the present invention is to provide a VoIP system that regulates the compressed voice data generation rate of a transmission system not to exceed channel capacity, and a method for preventing data loss in the VoIP system.

To achieve the above object, there is provided an method for voice communication over the above VoIP system in which the receiving system calculates the loss rate of the compressed voice data from the transmission system, and based on this calculation, determines a hold time for intercepting any further voice input. Then, the hold time is provided to the transmission system.

According to the preferred embodiment of the present invention, the VoIP system is equipped with a transmission system and a receiving system.

In the receiving system, there are two kinds of module: one is a voice data loss detection module to calculate the loss rate of the compressed voice data from the receiving system, and the other is a hold time decision-making module that determines the current hold time on the basis of the compressed voice data loss rate from the voice data loss detection module, generates a hold time information packet which includes an information on the current hold time, and transmits the generated hold time packet to the transmission system over the internet.

When the hold time information packet from the hold time decision-making part is received, the hold time display part in the transmission system displays the hold time to the transmitter.

Another embodiment of the present invention provides a method for preventing data loss in the VoIP system equipped with a transmission and receiving system, the method comprising the steps of: extracting compressed voice data from voice packets that are transmitted by the transmission system, calculating loss rate of the voice data based on the extracted compressed voice data, deciding a hold time for intercepting the transmitter's voice input to decrease the loss rate down to an allowable limit, and transmitting the hold time information to the transmission system.

Therefore, the transmitter temporarily stops his or her voice input during the hold time so that the compressed voice data loss can be prevented, and the VoIP system can perform better quality of voice communication.

BRIEF DESCRIPTION OF THE DRAWINGS

The above objects, features and advantages of the present invention will become more apparent from the following detailed description when taken in conjunction with the accompanying drawings, in which:

FIG. 5 is a flow chart with more details than FIG. 3.

DETAILED DESCRIPTION OF THE PREFERRED EMBODIMENT

Figure 1:
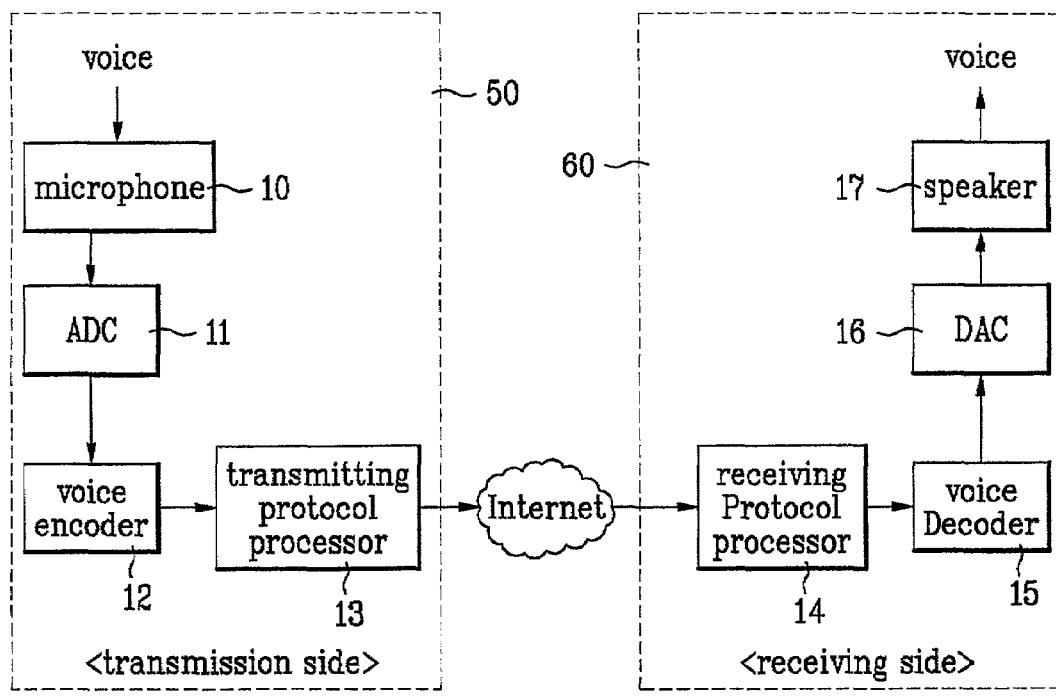
FIG. 1 is a block diagram illustrating a construction of a VoIP system voice communication over the internet according to the conventional VoIP system.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
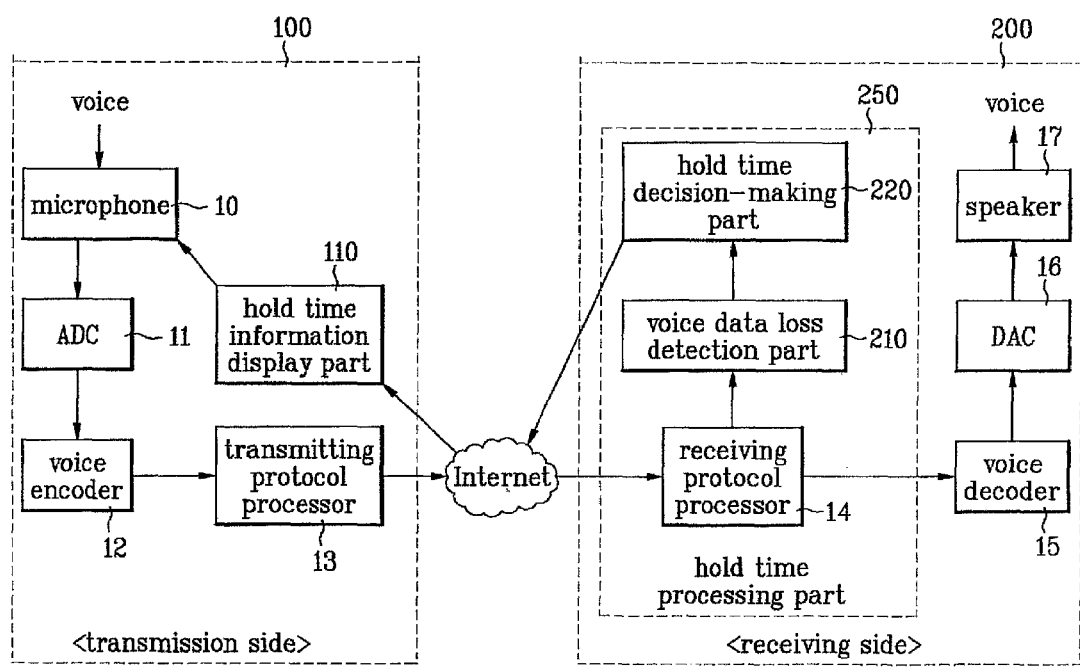
FIG. 2 is a block diagram illustrating a construction of the VoIP system according to the preferred embodiment of the present invention.

FIG. 2 is a block diagram illustrating a construction of the VoIP system according to the preferred embodiment of the present invention.

As illustrated in FIG. 2, the receiving system determines a time for intercepting voice input by the transmission system (hereinafter, it is referred 'hold time'), which is essential for regulating compressed voice data generation rate not to exceed channel capacity, and the hold time is transmitted to the transmission system over the internet. The transmission system, therefore, stops the voice input during the hold time.

The major components of the receiving system are a voice data loss detection part and a hold time decision-making part, in which the first calculates a compressed voice data loss rate and the latter determines a hold time based on the voice data loss rate from the voice data loss rate part, generates hold time information packets including the hold time information, and transmits the generated packets to the transmission system over the internet.

Meanwhile, the most important component in the transmission system is a hold time display part that receives the hold time information packets from the hold time decision-making part, and displays the hold time corresponding to the hold time information packets to the transmitter.

Thus, the transmitter can temporarily stop his or her voice input during the hold time, and in result, the VoIP system can prevent data loss due to excessive data therein.

The constructions of the transmission system and the receiving system of the VoIP system are explained in more detail with reference to FIG. 2.

As illustrated in FIG. 2, the transmission system 100 consists of a microphone 10, ACD 11, a voice encoder 12, a transmitting protocol processing part 13, and a hold time information display mole 110.

On the other hand, the receiving system 200 consists of a receiving protocol processing part 14, a voice decoder 15, DAC 16, a speaker 17, a voice data loss detecting part 210, and a hold time decision-making part 220.

The transmission system 100 converts the transmitter's voice inputted through the microphone 10 to generate voice packets therefrom, and transmits these voice packets to the receiving system 200 over the internet. The receiving system 200 processes the voice packets from the transmission system 100 to generate an analog voice signal of the transmitter, and later, the analog voice signal is output as the above voice through the speaker 17 for the recipient.

The following explains the operation of the VoIP communication system shown in FIG. 2. For the components of FIG. 2, since they are the same construction with those of FIG. 1, and have the equivalent capabilities, the same numerical references as those of FIG. 1 are used, and the details in those components are accordingly omitted here.

As shown in FIG. 2, the receiving system 200 includes a hold time processing part 250.

The hold time processing part 250 consists of the receiving protocol processing part 14, the voice data loss detection part 210, and the hold time decision-making part. The transmission system 100 is equipped with the hold time information display part 110 corresponding to the hold time processing part 200.

How the hold time processing part 250 works can be explained that the protocol processing part 14 in the receiving system 200 extracts the compressed voice data from the voice packets received over the internet, and transmits the extracted compressed voice data to the voice decoder 15 and the voice data loss detection part 210, respectively.

At this point, the compressed voice data is generated in the transmission system where the compressed voice data is converted to a packet format, and the transmission system transmits the voice packet to the receiving system 200.

The voice data loss detection part 210 calculates the compressed voice data loss rate using the compressed voice data received from the receiving system, and transmits the loss rate to the hold time decision-making part 220.

The hold time decision-making part 220 receives the compressed voice data loss rate, and determines a hold time based on this loss rate so that the compressed voice data generation rate does not exceed the designated channel capacity.

The hold time decision-making part 220 then transmits the hold time to the hold time information display part 110 over the internet. The hold time information display part 110, using the hold time information, informs the transmitter of the hold time through a screen that is installed in a terminal of the transmission system 100 or LED (light emitting diode) and so forth.

Figures 3, 4:
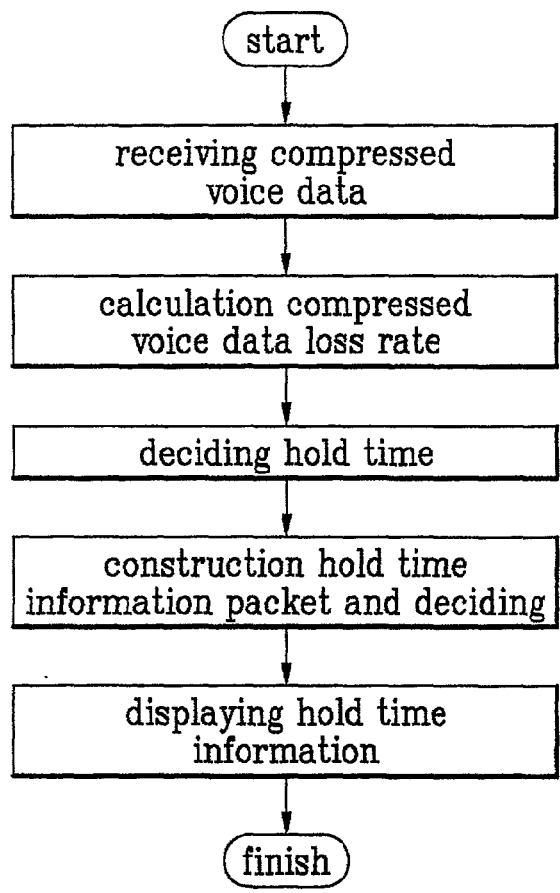
FIG. 3 is a flow chart illustrating the procedure of determining a hold time and transmitting the hold time by the VoIP system according to the preferred embodiment of the present invention.
FIG. 4 is a diagram illustrating an information packet format for the hold time.

FIG. 3 is a flow chart explaining the procedure from deciding a hold time to transmitting the hold time in the VoIP system according to the preferred embodiment of the present invention.

As shown in FIG. 3, the protocol processing part 14 of the receiving system 200 receives voice packets that are transmitted from the transmission system 100 over the internet, and extracts the compression voice data from the voice packets. This extracted compressed voice data is then transmitted to the voice data loss detection part 210.

The detection of the voice data packet loss is proceeded as follows.

First of all, each voice data packet has a RTP protocol header, and the number of sequence per packet is installed in the header. Thus, while receiving the voice data packets, if the sequence number installed in the header increases more than 2 units, not 1 unit in sequence as usual, the voice data loss detection part 210 detects that there is a loss on the voice data packet as much as the increment.

That is, the voice data loss detection part 210, after it receives the compressed voice data, figures out the number of lost voice packets by reading the packet order of the header in the voice packets (S31).

The voice data loss detection part 210 then compares the number of the voice packets transmitted from the transmission system 100 with the number of the lost voice packets, and calculates the packet a loss rate of the compressed voice data (S32).

The method for calculating a packet loss rate of the compressed voice data is now explained.

First of all, the on-chip memory records the number of the voice data packet D that is received from the voice data loss detection part 210 every 30 seconds.

As described above, each voice data packet has the RTP protocol header information and the packet sequence number. Thus, with these numbers, the voice data loss detection part 210, calculates the total voice data packet number (T) to be received from the maximum number (M) of the sequence and the minimum number (N) of the sequence among the voice data packets that are received for 30 seconds. The equation (1) therefor is as follows:

$$T = M - N \qquad (1)$$

Further, the voice data loss detection part 210 calculates the loss rate(L) of the voice data packets as explained in the following equation (2):

$$L = (T - D)/T \qquad (2)$$

For instance, the transmission system 100 transmitted 100 of voice packets for a designate time unit, but when taken for the analysis, the receiving system 200 only received 90 voice packets out of the total 100 voice packets, losing the remaining 10 voice packet, the compressed voice data packet loss rate in this case is 10%, that is, ($10/100$)*100=10%.

Later, the voice data loss detection part 210 transmits the calculated packet loss rate(L) of the compressed voice data to the hold time decision-making part 220.

In the meantime, the hold time decision-making part 220 decides the hold time S33 by comparing the voice data loss rate with an allowable loss rate (hereinafter, it is referred "allowable value").

The following explains how the hold time decision-making part 220 determines the hold time.

The voice data packet loss rate (L) is calculated every 30 seconds. Here, the initial value of the hold time is 0 second. By calculating the loss rate (L) per 30 seconds, if the loss rate (L) is higher than 5%, the hold time decision-making part 220 extends the hold time by 1 second. However, the hold time should not be longer than 5 seconds. Similarly, if the loss rate (L) per 30 seconds is less than 1%, the hold time decision-making part 220 decreases the hold time by 1 second. However, in this case, the hold time should not be shorter than 0 second. In the meantime, if the loss rate (L) is between 1% and 5%, the previous hold time continues as the current hold time.

Next, the hold time decision-making part 220 generates hold time information packets using the hold time information obtained from the above.

FIG. 4 illustrates a format of the hold time information packet.

A in the FIG. 4 is a service identifier and indicates the hold time information packet. In the invention example, the A is 4 bytes, 0000 0000 0000 0000 0000 0000 0000 0000.

B in the FIG. 4 is a session ID number, which is given to every telephone call. In the invention example, the B is 3 bytes.

C in the FIG. 4 indicates a hold time, which means the waiting time before starting the next sentence during a telephone call. In the invention example, C is 1 byte. If the C is 0000 0000, 0000 0001, 0000 0010, 0000 0100, 0000 1000, and 0001 0000, the corresponding hold time is 0 second, 1 second, 2 seconds, 3 seconds, 4 second, and 5 seconds in sequence.

The hold time decision-making part 220 transmits the voice data packets formatted as FIG. 4 to the hold time information display part 110 of the transmission system 100 over the internet.

On the other hand, when the hold time information packet is received, the hold time information display part 110 installed in the transmission system 100 displays the hold time to the transmitter through LED (light emitting diode) or the monitor.

Therefore, the transmitter can control the conversation speed by temporarily stopping his or her voice input during the hold time in order to maintain the compressed voice data generation rate below the designated channel capacity.

FIG. 5 is a detailed flow chart illustrating the procedure of decision-making the hold time as in FIG. 3, and the procedure of generation and transmission of the hold time information packet.

To begin with, the hold time decision-making part 220 receives the compressed voice data packet loss rate (L) from the voice data loss decision-making part 210. Then, the hold time decision-making part 220 decides whether the compressed voice data packet loss rate (L) exceeds the designated allowable value or not (S42).

In the invention example, the designated allowable values are 5% and 1%. If the loss rate (L) reaches 5%, the voice corresponding to 0.5 second out of 10 seconds is lost, which creates difficulty for the user during a telephone call since the lost voice corresponding to the 0.5 second is the same with the length of one syllable. Meantime, if the loss rate (L) becomes 1%, the voice corresponding to 0.1 second out of 10 seconds is lost, which makes no difference to the user. In this case, the lost voice corresponding to the 0.1 second is much shorter than the length of one syllable.

Meanwhile, the voice encoder 12 in the transmission system 100 uses international standard voice compression, G.723.1 or G.729A.

At the result of decision, if the compressed voice data packet loss rate (L) is higher than the allowable value, i.e., 5%, the hold time decision-making part 220 increases the previous hold time (here, the initial value of the hold time is '0') by 1 second (S46). At this time, if the hold time is too long, the communication between the transmitter and the recipient might not be in the good condition, thus it becomes necessary to predesignate the maximum hold time (e.g., in the invention example, it is 5 seconds.). Thus, it is evaluated whether or not the increased hold time is larger than the maximum hold time (hereinafter, it is referred to 'maximum value') (S47).

If the increased hold time is larger than the maximum value, the maximum value is re-adjusted to be equal to the current hold time (S48). However, if the increased hold time is not larger than the maximum value, the increased hold time is set to be the current hold time.

On the other hand, if the compressed voice data loss rate (L) is not larger than the allowable value (e.g., 1% as in the invention example), the hold time decision-making part 220 decreases the previous hold time by 1 second (S43). Since the hold time can not have a negative value, the reduced hold time can't be less than '0'.

Further, the hold time decision-making part 220 determines whether or not the reduced hold time is lower than '0'. Then, if the reduced hold time is less than '0', the hold time decision-making part 220 designates '0' as the current hold time (S45). However, if the reduced hold time is not less than '0', the reduced hold time is set to be the current hold time.

As explained before, the hold time decision-making part 220 generates the hold time information packet including the current hold time information once the current hold time is determined by increasing or decreasing the previous hold time after comparing the compressed voice data loss rate and the allowable values (S49).

The hold time information packets are transmitted over the internet to the hold time information display part 110 in the receiving system 200. If the hold time information packets are received by the receiving system 200, the hold time information display part 110 informs the current hold time to the transmitter by controlling a terminal or LED of the transmitter (S50).

Accordingly, after the transmitter checks the hold time provided from the receiving system 200 through the terminal or LED, the transmitter does not input his or her voice through the microphone 10 during the hold time (i.e., he or she does not talk at all).

In this manner, the compressed voice data generation rate can be maintained below to the designated channel capacity to the transmitter.

According to the present invention, as for the voice communication over the VoIP system, in order for the compressed voice data generation rate of the transmission system not to exceed the channel capacity assigned to the transmitter, the receiving system calculates the compressed voice data loss rate and decides the hold time for temporarily holding the voice input. Therefore, the compressed voice data loss can be prevented, and the communication quality of the VoIP system can be much improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A VoIP system for voice communication over the internet, the VoIP system comprising:
    a receiving system in which the receiving system is equipped with a voice data loss detection part for calculating a compressed voice data packet loss rate per designated time, using compressed voice data packets received over the internet, wherein each voice data packet comprises a protocol header with a sequence number, and a hold time decision-making part for deciding a current hold time per designated time using the voice data packet loss rate and generating hold time information packets; and
    wherein, a transmission system for providing the compressed voice data packets, being equipped with a hold time display part for displaying the hold time based on the hold time information packets that are received over the internet.

2. The VoIP system of claim 1, wherein the hold time decision-making part has a first allowable value and a second allowable value lower than the first allowable value, and decides the current hold time by comparing the compressed voice data loss rate with the first allowable value, thus if the compressed voice data packet loss rate is larger than the first allowable value, previous hold time increases by a designated time unit.

3. The VoIP system of claim 2, wherein the first allowable value is 5%, and the designated time unit is 1 second.

4. The VoIP system of claim 2, wherein the hold time decision-making part determines the current hold time by decreasing the previous hold time by the designated time unit if the compressed voice data loss rate is lower than the second allowable value.

5. The VoIP system of claim 4, wherein the second allowable value is 1%, and the designated time unit is 1 second.

6. The VoIP system of claim 2, wherein the designated time unit for calculating the packet loss rate is 30 seconds.

7. The VoIP system of claim 1, wherein the hold time information packet is formatted to comprise an internet protocol header part, a service identifier part A for indicating the hold time information packet, a session ID number part B given to every telephone call, and a hold time part C for indicating a waiting time that commands a user to temporarily stop before staring another sentence during a telephone call.

8. The VoIP system of claim 6, wherein the service identifier part A is 4 bytes, the session ID number part B is 3 bytes, and the hold time part C is 1 byte.

9. The VoIP system of claim 7, wherein if the hold time part C is 0000 0000, the hold time is 0 second, if the hold time part C is 0000 0001, the hold time is 1 second, if the hold time part C is 0000 0010, the hold time is 2 seconds, if the hold time part C is 0000 0100, the hold time is 3 seconds, if the hold time part C is 0000 1000, the hold time is 4 second, and if the hold time part C is 0001 0000, the hold time is 5 seconds, and the service identifier part A being 0000 0000 0000 0000 0000 0000 0000 0000.

10. The VoIP system of claim 1, wherein the voice data loss detection part detects that voice data loss is occurred as much as an increment if the sequence number increases more than 2 units, not increasing 1 unit gradually, while receiving the voice data packets.

11. A method for preventing data loss in a VoIP system, the method comprising the steps of:
    transmitting compressed voice data in a form of a packet from a transmission system to a receiving system over the internet;
    extracting the compressed voice data from the voice data packets received by the receiving system, and calculating a designated time unit of a compressed voice data packet loss rate;
    deciding a current hold time per designated time unit by comparing the packet loss rate with a first allowable value and a second allowable value that is lower than the first allowable value in the receiving system; and, transmitting a hold time information packet to the transmission system.

12. The method of claim 11, further comprising:
displaying the hold time based on the hold time information received by the transmission system through a display means.

13. The method of claim 11, wherein the designated time unit is 30 seconds, the first allowable value is 5%, and the second allowable value is 1%.

14. The method of claim 11, wherein the total number T of the voice data packets and the voice data packet loss rate L are calculated applying the following algorithm:

$$T = M - N$$

$$L = (T - D)/T$$

wherein M is a maximum sequence number and N is a minimum sequence number among the voice data packets that are received per designated time unit.

15. The method of claim 11, wherein the hold time information packet is formatted to comprise an internet protocol header part, a service identifier part A for indicating the hold time information packet, a session ID number part B given to every telephone call, and a hold time part C for indicating a waiting time that commands a user to temporarily stop before staring another sentence during a telephone call.

16. The method of claim 15, wherein the service identifier part A is 4 bytes, the session ID number part B is 3 bytes, and the hold time part C is 1 byte.

17. The method of claim 16, wherein if the hold time part C is 0000 0000, the hold time is 0 second, if the hold time part C is 0000 0001, the hold time is 1 second, if the hold time part C is 0000 0010, the hold time is 2 seconds, if the hold time part C is 0000 0100, the hold time is 3 seconds, if the hold time part C is 0000 1000, the hold time is 4 second, and if the hold time part C is 0001 0000, the hold time is 5 seconds, and the service identifier part A being 0000 0000 0000 0000 0000 0000 0000 0000.

18. The method of claim 11, wherein the steps, from deciding the hold time to transmitting the hold time information in a packet form to the transmission system, comprises the steps of, evaluating whether or not the compressed voice data loss rate is higher than the first allowable value, based on said evaluating whether or not the compressed voice data loss rate is higher than the first allowable value, increasing a previous hold time by 1 time unit if the compressed voice data loss rate is higher than the first allowable value, evaluating whether or not the increased hold time is higher than a designated maximum hold time value, based on said evaluating whether or not the increased hold time is higher than the designated maximum hold time value, designating the increased hold time to be the current hold time if the increased hold time does not exceed the maximum hold time value, and designating the maximum value to be the current hold time if the increased hold time exceeds the maximum hold time value, generating the hold time information packets based on the designated current hold time, and transmitting the hold time information packets to the transmission system over the internet.

19. The method of claim 18, wherein the designated maximum hold time value is 5 seconds, and a first time unit is 1 second.

20. The method of claim 11, wherein the steps, from deciding the hold time to transmitting the hold time information in a packet form to the transmission system, comprises the steps of, evaluating whether or not the compressed voice data loss rate is lower than the second allowable value, based on said evaluating whether or not the compressed voice data loss rate is lower than the second allowable value, decreasing a previous hold time by 1 time unit if the compressed voice data loss rate is lower than the second allowable value, evaluating whether or not the decreased hold time is lower than a designated minimum hold time value, based on said evaluating whether or not the decreased hold time is lower than a designated minimum hold time value, designating the decreased hold time to be the current hold time if the decreased hold time is not lower than the minimum hold time value, and designating the minimum value to be the current hold time if the decreased hold time is lower than the minimum hold time value, generating the hold time information packets based on the designated current hold time, and transmitting the hold time information packets to the transmission system over the internet.

21. The method of claim 20, wherein the designated initial minimum value is 0 second, and a first time unit is 1 second.

* * * * *